March 17, 1964
K. E. FOSNES
3,125,067
MILKING MACHINE MANIFOLD
Filed Oct. 2, 1961
2 Sheets-Sheet 1
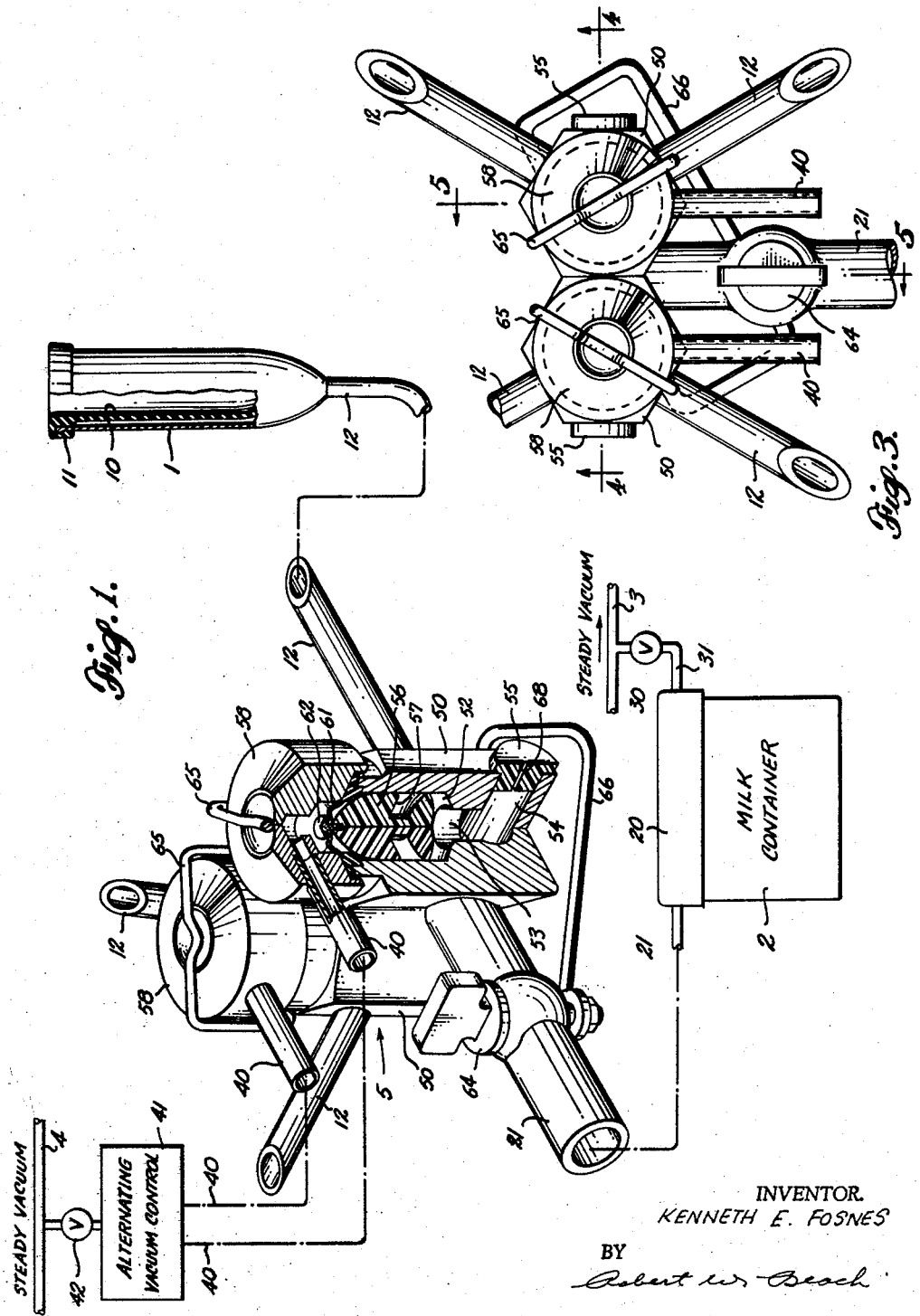
INVENTOR.
KENNETH E. FOSNES
BY
ATTORNEY March 17, 1964  K. E. FOSNES  3,125,067
MILKING MACHINE MANIFOLD
Filed Oct. 2, 1961  2 Sheets-Sheet 2
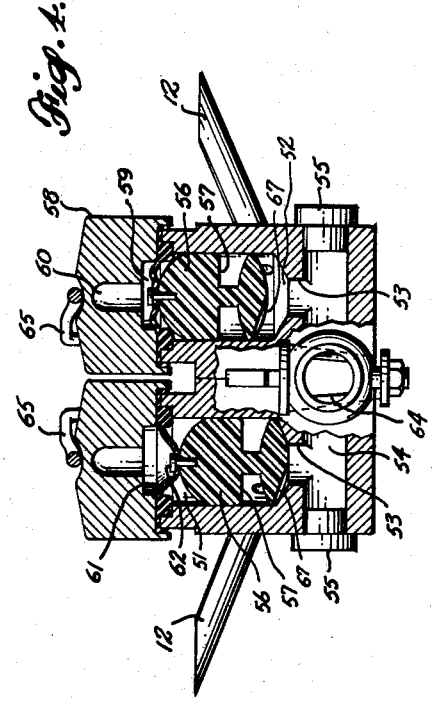
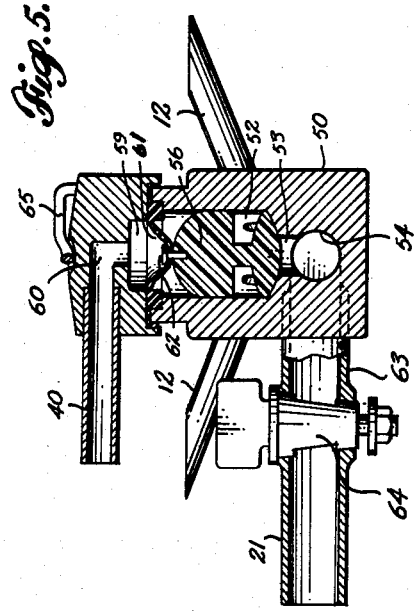
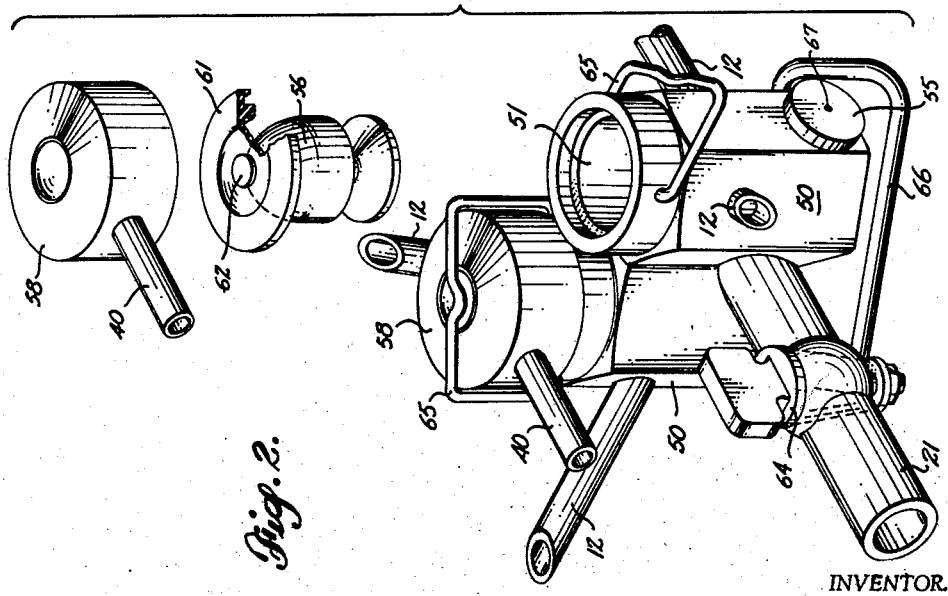
INVENTOR.
KENNETH E. FOSNES
BY
ATTORNEY

United States Patent Office 3,125,067
Patented Mar. 17, 1964

3,125,067
MILKING MACHINE MANIFOLD
Kenneth E. Fosnes, 10602 NE. 26th, Bellevue, Wash.
Filed Oct. 2, 1961, Ser. No. 142,387
3 Claims. (Cl. 119—14.55)

This invention is concerned with apparatus for milking cows and particularly that component of the apparatus which is interposed between a source of suction and the teat cups which are applied to the teats of a cow. This component, designated a milking machine manifold, is connected by individual flexible tubes to the individual teat cups to apply suction to them and to receive milk from them and additionally, is connected to a receiver for the milk withdrawn from the cow.

The modern tendency in dairying is toward mass production so that dairies have larger numbers of cows and it is difficult to obtain experienced personnel to milk the cows. Also, the tendency in modern dairying is toward bulk handling of milk in closed systems to improve sanitation. Consequently, milking machines frequently are connected to a milk storage tank by suitable piping without any manual handling and such milk is pumped from the storage tank into a tank truck and transported in bulk to a pasteurizing and bottling plant. Mechanical milking apparatus has therefore become virtually an indispensable part of the equipment of a modern dairy.

The theory of milking cows by mechanical apparatus, as distinguished from hand milking, is good but in practice it has been found that undesirable effects have been produced on the cows. The action of some milking apparatus is severe by subjecting the teats of a cow to prolonged suction and hard squeezing action which results in manipulating the teat to cause soreness and drawing blood into the teat causing congestion. Moreover, the hard squeezing action, coupled with the strong suction, tends to cause the muscles of the cow to become tense, restricting the discharge of milk instead of expediting it. For this reason the milking operation takes longer than it should and it is difficult for the milking apparatus to milk the cow dry.

Because of the abuse to which the teats of a cow are subjected by various types of mechanical apparatus, the teats are inclined to become inflamed and sore. The presence of this condition further increases the difficulty of milking the cow by mechanical apparatus. Moreover, the teats and udder of a cow may become infected, which condition is known as mastitis. The action of conventional milking apparatus is inclined to aggravate this unhealthy condition still further.

A principal object of the present invention is to provide mechanical milking apparatus for cows which will cause the teat cups to have a gentle action on the cows' teats, closely comparable to hand milking, so that the teats will not be abused and made sore or inflamed. In accomplishing this object the teats are not subjected continuously to a strong suction, but periods of strong suction accompanied by a squeeze alternate with rest and fill periods. In the rest and fill periods the squeeze is relaxed and the suction to which the teats are subjected is greatly reduced. The severity of the milking action is further temporized by decreasing the frequency and increasing the length of the milk extraction and rest periods of each cycle. A further object is to eliminate the possibility of subjecting the teats of a cow to a prolonged steady, strong suction without any squeezing action if the pulsating mechanism of the milking apparatus effecting the squeezing action should fail for any reason.

It is also an object of this invention to increase the effectiveness of mechanical milking apparatus so as to reduce the time required for the milking operation, while at the same time increasing the efficiency of the milking action so that the cow in each instance will be milked dry by the apparatus itself, thus eliminating the necessity of resorting to a manual stripping operation to complete the milking. In this regard it is an object to render the entire milking operation more like that produced by hand milking, or by a suckling calf.

Another object is to provide milking apparatus which can be applied to a cow and subsequently removed quickly and easily, yet which during the milking operation will be held reliably attached to the cow and maintain a consistently uniform operation without attention by an attendant. It is not necessary to provide a stand for supporting the apparatus from the floor, or a surcingle for suspending the apparatus from the cow independently of the teat cups and their tubes connected to the manifold.

Still a further object is to provide apparatus which is sanitary, both by being made of material which will not pollute the milk and by being constructed so that the manifold can be disassembled quickly into components which can be washed and sterilized readily.

Another object is to provide a milking apparatus manifold which is compact, made of few parts and is comparatively inexpensive to manufacture.

These various objects can be accomplished by including in the milking apparatus a milking machine manifold, including a valve controlled by a steady suction and by a pulsating suction which is connected to teat cups of conventional type for subjecting such cups alternately to a strong suction and to a weak suction, and which manifold is suspended from such teat cups. Preferably the manifold includes two valves moving in opposite phases for subjecting two pairs of cups alternately to strong suction. Such manifold can be disconnected from the teat cups, a conventional milk receiver and conventional suction sources, and can be disassembled and the valves removed from the valve body to enable the entire manifold to be cleaned thoroughly with ease.

FIGURE 1 is a top perspective view of milking apparatus including the milking machine manifold of the present invention with parts broken away and with other parts of the apparatus shown diagrammatically. FIGURE 2 is a similar perspective view of the manifold with parts shown in exploded relationship and having portions broken away.

FIGURE 3 is a plan view of the manifold with parts broken away. FIGURE 4 is substantially a central longitudinal section through the manifold on line 4—4 of FIGURE 3, and FIGURE 5 is a section substantially on line 5—5 of FIGURE 3.

As shown in FIGURE 1, milking apparatus is composed ordinarily of four principal components, namely, teat cups including an outer shell 1 and an inner flexible liner 10 capable of being drawn inward into squeezing engagement with a teat, a milk container 2 which may be either a bucket or a storage tank into which milk is drawn by suction from a vacuum line 3, a vacuum or suction source 4 controlled by a pulsator or an alternator, and a manifold 5 which is connected by flexible tubing to the teat cups, the milk container and the pulsating suction or vacuum source. Of this apparatus the teat cups, milk container, vacuum or suction source 3 and vacuum or suction source 4 controlled by an alternator or pulsator, may be conventional, this invention being concerned only with the manifold 5 provided that it is associated with suitable types of other components in the apparatus.

Usually the liner 10 of the teat cup in relaxed condition is somewhat smaller than the rigid shell 1 of the cup in which the liner is received so as to leave a small annular space between these two elements. The upper end of the liner is folded over the upper edge of the cup shell to provide a downwardly extending flange 11 for holding the liner in place relative to the rigid shell and to cushion engagement of the cup with the teat and udder of the cow. The lower end of the liner 10 is connected to the flexible tube 12 through which milk can be withdrawn from the teat cup and suction applied to the cavity within the liner 10. Some teat cups have a tube communicating with the space between the cup shell and the liner 10 for the purpose of applying suction to this space for expanding the liner 10 toward the shell wall in opposition to the action of suction within the liner, but no such auxiliary connection is needed where the manifold of the present invention is used. The space between the cup shell and the liner can be at atmospheric pressure, or can be sealed. The pressure in the space between the shell and the liner is thus substantially greater than the pressure within the cavity of the liner when the tube 12 is subjected to the strongest suction used in the apparatus. If this space is sealed the severity of the squeeze is decreased.

For the steady vacuum line 3 any suitable suction source can be used, as is conventional with milking apparatus, and a valve 30 is provided to control the connection through pipe 31 between the line 3 and the milk container 2. The valve 30 should be capable of closing the conduit 31 so that it will not be subjected to any suction when the apparatus is not in use for milking and in addition, the valve means may include a pressure regulator so that the suction to which pipe 31 is subjected is approximately 15 inches of mercury, or 7½ pounds per square inch.

The milk container 2 ordinarily will be a storage tank, although this container could be eliminated entirely and the milk could be taken by pipe line directly to a processing plant if desired. Alternatively, the container could be simply a milk bucket which preferably would be closed by the cover 20, although some other provision might be made for discharging from the pipe 21 connected to the cover milk drawn into such pipe.

Four teat cup tubes 12 are connected to the manifold 5 and it is preferred, although it is not essential, to divide such teat cups into two pairs and to draw milk alternately first from one pair of teat cups and then from the other pair. To accomplish this operation it is necessary to have two pulsating suction or vacuum connections 40 to the manifold from the suction or vacuum line 4 and such alternate suction operation can be accomplished by the alternating vacuum control mechanism 41, which is of conventional construction. A valve 42 is interposed between the vacuum or suction line 4 and the alternating vacuum control 41, which can be closed to sever the connection to the vacuum line when the apparatus is not in use. Like the valve 30, valve 42 also can include pressure regulating means so that a pulsating vacuum having a suction of approximately 15 inches of vacuum, or 7½ pounds, can be impressed on the pulsating or intermittent suction lines 40 connected to the manifold 5.

The manifold of the present invention preferably includes identical twin control valve assemblies, although certain of its advantages can be obtained by the use of only one of such assemblies. Since the two assemblies are virtually identical a description of one of them will be applicable to both. The body of the manifold is shown composed of siamese twin valve bodies 50, preferably of hexagonal cross section having flat sides of such bodies joined, as shown in FIGURES 2 and 3. In each valve body is a valve chamber 51, preferably in the form of a cylindrical bore, the axis of which is upright, when the manifold is in the attitude of use. In the bottom of the valve chamber is a valve seat 52, shown best in FIGURE 4, which slopes centrally and downward to an outlet 53 from the valve chamber emptying into a duct 54 extending transversely of the valve bores and communicating with the outlet apertures from both valve chambers. This duct opens at opposite sides of the manifold and its opposite ends are closed by plugs 55 which are readily removable for access to the duct. These plugs may be of plastic of a character which will not adulterate milk and can simply be pressed into place because the suction in the duct 54 will tend to hold them in the ends of such duct.

A valve 56 is slidably received within each chamber 51 for upward and downward sliding movement between the lower position shown at the left of FIGURE 4 and the upper position shown at the right of that figure. Each valve preferably is of circular cross section and the upper portion of the valve should fit quite closely in its bore. Each valve has a circumferential groove 57 located between its ends and the portion of the valve below this groove either should have rather a loose fit in the valve body bore, or some other type of clearance space should be provided so as to afford reasonably free communication between the circumferential groove and the portion of the valve chamber beneath the valve to enable flow of milk past this portion of the valve.

The upper end of each valve chamber 51 is closed by a cap 58 fitting on the upper end of the valve body 50. In each of these caps is a central cavity 59 located generally in registry with the valve chamber of the body when the cap is in place. A duct 60 through the cap establishes communication between such cavity and the tube 40 for that particular valve unit which is connected to the alternating vacuum control mechanism 41 so as to impose suction intermittently in the upper portion of each valve chamber above the valve. To prevent the possibility of milk being withdrawn from the valve chamber upward into the cavity 59, such chamber and cavity are separated by a flexible diaphragm 61 which is attached to the upper end of the valve 56 in any suitable fashion such as by the headed pin 62. When suction is applied through the tube 40 to the cavity 59, the diaphragm 61 will be drawn upwardly and connection of such diaphragm to the valve will insure that such valve is also raised into its uppermost position shown at the right of FIGURE 4.

For convenience of construction and to reduce the number of parts the marginal portion of the diaphragm 61 is fashioned as a gasket fitting between the upper end of the valve body 50 and the lower side of the cap 58 to effect a seal between such parts. Part of such marginal portion may be thickened, as shown in FIGURES 4 and 5, to constitute a resilient stop engageable by the upper end of the valve 56 when it moves to the uppermost position shown at the right of FIGURE 4. In order to reduce the maximum deformation of the diaphragm 61 as the valve moves to its opposite extreme positions, the upper end of the valve may be formed of dome shape which will also provide a good seat for the upper end of the valve on the thickened portion of the diaphragm when the valve is in its uppermost position.

Where the manifold has two valve bodies 50, two tubes 12 connected to the teat cups 1, respectively, will extend from each valve body. In order to attach these tubes conveniently to the valve body they may be mounted on or their ends inserted into flat faces of the valve body, as indicated best in FIGURES 1, 2 and 3. Each of these tubes opens into one of the valve chambers 51 near its lower end, but above its valve seat 52. The stroke of each valve 56 between its upper and lower positions should be such that the opening of the tube will be virtually uncovered when the valve is in each of its extreme positions. As shown in FIGURE 4, when the valve is in its lowest position, as in the left chamber, the opening from the tube 12 into the chamber will be above the lower portion of the valve and in registry with the peripheral groove 57 in the valve. When the valve has been raised to its upper position at the right of FIGURE 4 the opening from the tube 12 will be below the lower portion of the valve for direct flow of milk over the valve seat 52 through the outlet 53 into the duct 54.

When the manifold includes two valve units as described, it is preferred that the pulsating suction tubes 40 be connected independently to the alternating vacuum source 1 so that suction will be exerted on the right valve unit, as shown in FIGURE 4, while suction is not imposed on the left unit. During the next period of operation the suction to the upper end of the right unit will be discontinued while suction is applied to the upper portion of the left valve unit. In this way milk will be extracted from one pair of suction cups 1 alternately with the extraction of milk from the other pair of suction cups. If it is desired to extract milk simultaneously from all four suction cups, however, the two tubes 40 can be connected together and both of them connected such as by a Y-connection to a source of pulsating vacuum.

In whichever way the valve mechanism is operated, the milk can be delivered from the duct 54 through a single spigot 63, flow through which can be controlled by a stopcock 64 having a tapered body. Such taper causes the cock normally to seal in closed position or in open position, but it may be released readily for rotation by affording clearance at the bottom of its stem so that the valve body can be lifted to free it for rotation.

The valve body and caps can be constructed of stainless steel, for example, which will not adulterate the milk, the valves 56 can be made of relatively hard plastic such as molded nylon and the diaphragm 59 can be made of flexible plastic or rubber material. The caps 58 can be held on the body by securing bails 65 mounted to swing away from tubes 40 and the other valve body in each instance so as to avoid interference with these parts when the cap is being freed, as shown in FIGURE 2. A supporting bail 66 can be mounted on the lower portion of the manifold to enable the manifold to be hung conveniently for storage purposes.

At the beginning of a milking operation the teat cups will be connected to the manifold by the tubes 12 and this manifold will be connected to the milk container, in turn connected to a steady vacuum source, and the caps 58 will be connected to the alternating vacuum source, as shown in FIGURE 1. With all of valves 30, 42 and 64 in open position the cups are then applied to the teats of a cow with the pair of cups connected to one valve body attached to the teats at one side of the cow and the other pair of teat cups connected to the other valve body attached to the two teats at the other side of the cow. The cups may simply be moved upward over the teats to apply them while the manifold is being supported by hand. Because suction is being applied to the several cups at this time they will be held in place and the milking operation will begin immediately.

Each cup will be subjected to a strong suction, preferably of approximately 15 inches of mercury for about one second, although the degree of suction and the length of time it is applied can be adjusted. Such strong suction period is followed by a rest and fill period of approximately one-half second. Such reduction in vacuum is caused by interruption of the suction above the valve in the valve chamber connected to that particular cup, so that the valve 56 in such chamber will be moved into engagement with its seat 52, both by the action of gravity and the suction in the duct 54. The suction in the particular cup will not be reduced to zero, however, because some communication across the valve seat is provided between the duct 54 and the suction cup through the small bleed groove 67 provided in one of the valve elements 52 and 56, which, in the construction shown in FIGURE 4, is in the valve 56.

Each time suction is applied to the cap of the corresponding valve element its valve will be raised into the position shown at the right of FIGURE 4 to enable a strong suction to be produced in the cup communicating with such valve chamber. The transition between a strong suction period and a rest period, during which a relatively weak suction is applied to the cup, does not occur abruptly but each complete cycle of strong suction period and rest period will require about one and one-half seconds, of which the strong suction period will be approximately twice as long as the rest period. There will thus be about 40 complete cycles every minute. Not only is the teat subjected to a strong suction during the milk extraction period, but such suction will contract the liner of the cup around the teat to produce a squeezing action which assists in extracting the milk.

As has been mentioned previously, it is preferred that one valve chamber be connected to the two teat cups attached to the teats at one side of the cow and the other valve chamber communicate with the two teat cups attached to the teats of the other side of the cow. By supplying suction to the caps of the manifold alternately one of the valves 56 will be in its upper position when the other valve is in its lower position. Consequently, strong suction will be exerted in at least two cups at any given time, which will insure that the weight of the manifold will be reliably supported despite the reduced suction which may be applied at the particular time to the other two teat cups. The manifold should be sufficiently light to insure such support of it and preferably its weight is approximately two pounds. Also, by alternating the application of strong suction in the teat cups from side to side of the cow, the manifold is caused to swing from side to side rhythmically which assists the milking operation. Such swing is particularly effective if the duration of suction application is reasonably slow, such as 40 cycles per minute as suggested above, instead of appreciably faster.

It will be recognized that by use of the apparatus described the teats will not be subjected to strong suction for a prolonged period because the periods of strong suction alternate with periods of greatly reduced suction. Also, it is not necessary to attempt to interrupt the effect of strong suction by contraction of the teat cup liner because the low suction periods are reliably under the control of the valves in the manifold of the present invention. During the period of weak suction any milk which flows through the tubes 12 and is not removed through the bleed groove 67 can accumulate in the circumferential groove 57 of the valve 56 and will flow out through the valve chamber outlet 53 when the valve is next opened. In completing the milking operation the combined variable suction and the mechanical pull of the teat cups resulting from the swinging of the manifold from side to side has been found to produce an effective stripping action, so that manual stripping of the cow after the milking apparatus has been removed is not required.

When the milking of a particular cow has been completed an attendant can lift the stem of valve 64 and turn it into closed position so as to sever the connection between the valve chambers and the milk suction line. The teat cups will not produce suction thereafter, so that the milking apparatus can be removed because the teat cups will fall from the teats. Because the strong suction is not applied continuously to the teat cups it is not essential, however, for the milking apparatus to be removed from the cow immediately after the cow has been milked dry.

After the apparatus has been removed from the cow the manifold can be disconnected from other parts of the apparatus, the plugs 55 removed from opposite ends of the duct 54, the bails 65 swung down and the caps 58 taken off. The valves 56 will then slide out readily, enabling the valve bodies, valves and caps to be washed separately with all parts of each element readily accessible. The entire apparatus may thus be kept in a completely sanitary condition.

Use of a manifold of the present invention provides definite advantages over the conventional type of milking apparatus. In systems where a steady vacuum is applied to the teat cups at all times it is important that the pulsating suction be consistent so that the teat cups are subjected to the same degree of squeeze during each rest period. In the use of the apparatus of the present invention, on the other hand, as has been explained above, the rest period is produced by closing of a control valve and when this valve is closed the suction in the teat cup will be reduced to approximately 5 inches of mercury, even though the degree of suction in the constant vacuum line may vary to some extent. On the other hand, if the vacuum source pressure should increase to an extent sufficiently great so that the valves 56 would not be lifted, the teats would be subjected to only a small suction with the valves in closed position and the milking operation would be interrupted. While such interruption is undesirable it is preferable to the teats being subjected to a continuous vacuum without intermittent squeezing.

Even though the suction in the vacuum line remains substantially constant and the pulsator is in proper working order, it does not necessarily mean that the milking action of the apparatus would be the same in every instance, nor that the teat cups would always operate to give a uniform squeezing action in effecting a rest period. Actually, the degree of squeezing action on the cows' teats will vary from cow to cow and from teat cup to teat cup because larger teats would be subjected to a harder squeeze than smaller ones, caused by the inward stretch of the teat cup liners. Also, the material of which the teat cup liners is made can alter the severity of the squeezing action. The wall thickness and age of the liner material further affects its resiliency. In conventional types of milking apparatus, therefore, such variable factors can have an appreciable influence on the degree and duration of the rest period caused by contraction of the liner in the teat cup. In the present apparatus contraction of the liner is not relied upon to produce a rest period, but, as has been explained, such rest period results from the reduction in suction produced by closing of a valve 56.

The apparatus of the present invention is particularly advantageous for use in milking systems in which the milk is transported for some distance from the manifold 5 to a storage container. In order to enable such transportation of milk through a piping system to be reliable, it is necessary that a strong suction be applied to the piping system 21. In the conventional type of milking apparatus this means that the same strong suction would be applied to each individual teat cup and the air supplied to the suction line must enter the system through the mouths of the teat cups. The fit of each teat cup on each cow therefore becomes important and it is simply impossible to have even approximately complete uniformity in this regard. The transfer piping frequently is located sufficiently high to occupy an overhead position, which means that the milk must be lifted from each manifold through a height of 6 to 8 feet. If sufficient suction is not developed in the system, the milk simply would not be carried through the transfer pipes 21, which would greatly interfere with the milking operation.

With the present manifold it is not necessary to rely on the air entering the system through the mouth of the teat cups for transporting the milk through the milk lines. For this purpose the duct 54 in the manifold is provided with a small air supply aperture which conveniently may be formed in one of the plugs 55. In FIGURES 1 and 2 such air supply aperture is shown as the hole 68, which may be approximately one sixty-fourth of an inch in diameter. Even when one of the valves 56 is closed, therefore, air will continue to be supplied to the duct 54 for assisting movement of the milk through the milk lines. Such air supply source, independent of the teat cups, insures that the milk will be carried through the transfer lines 21 however tightly the teat cups 1 may fit a particular cow or cows.

I claim as my invention:

1. A milking machine manifold comprising a body having twin valve chambers therein in side by side relationship, a valve reciprocable in each such valve chamber, a valve seat in each such valve chamber beneath said valve and closeable by the valve of such valve chamber in its lower position, said valve body having therein two ducts positioned to communicate respectively with such valve chambers and adapted to be connected to separate teat cups, said body having a milk outlet and steady suction duct communicating past said valve seat and a portion of each of the valve chambers below its valve when its valve is raised out of engagement with the valve seat of its chamber for withdrawing milk from such valve chambers, and said valve body having two ducts communicating respectively with the two valve chambers above said valve seats and adapted to be connected to an alternating suction source for holding one of said valves out of engagement with its valve seat when the other of said valves is in engagement with its valve seat.

2. The milking machine manifold defined in claim 1, in which the milk outlet and steady suction duct is a through straight passage, having its opposite ends opening at opposite sides of the body to facilitate cleaning of such passage, and covering means operable to close the opposite ends of such through passage.

3. The milking machine manifold defined in claim 2, in which the closing means for the opposite ends of the through passage are removable plugs.

References Cited in the file of this patent
UNITED STATES PATENTS
2,896,573    Schalm et al. _____ July 28, 1959